United States Patent
Hoehn

(10) Patent No.: US 6,640,161 B1
(45) Date of Patent: Oct. 28, 2003

(54) METHOD FOR OPERATING A STEAM STRIPPED FRACTIONATION COLUMN

(75) Inventor: Richard K. Hoehn, Mount Prospect, IL (US)

(73) Assignee: UOP LLC, Des Plaines, IL (US)

(*) Notice: Subject to any disclaimer, the term of this patent is extended or adjusted under 35 U.S.C. 154(b) by 261 days.

(21) Appl. No.: 09/773,742

(22) Filed: Feb. 2, 2001

(51) Int. Cl.[7] .............................................. G05B 21/00
(52) U.S. Cl. ....................... 700/270; 700/266; 700/271; 700/272; 700/273; 422/62; 422/107; 422/108; 422/109; 116/101; 116/216
(58) Field of Search ................................. 700/270–273, 700/266; 422/107–109; 116/101, 216, 62

(56) References Cited

U.S. PATENT DOCUMENTS

| | | | | |
|---|---|---|---|---|
| 3,165,454 A | * | 1/1965 | Wienecke | 202/160 |
| 3,230,154 A | * | 1/1966 | Walker | 203/40 |
| 3,294,648 A | * | 12/1966 | Lupfer et al. | 203/2 |
| 3,296,097 A | * | 1/1967 | Lupfer | 203/2 |
| 3,308,040 A | * | 3/1967 | Johnson et al. | 203/1 |
| 3,309,287 A | * | 3/1967 | Lupfer et al. | 203/1 |
| 3,361,646 A | * | 1/1968 | MacMullan et al. | 202/206 |
| 3,415,720 A | * | 12/1968 | Rijnsdorp et al. | 202/181 |
| 3,421,610 A | * | 1/1969 | Marshall | 196/99 |
| 3,423,291 A | * | 1/1969 | Oglesby | 202/160 |
| 3,428,528 A | * | 2/1969 | Oglesby, Jr. et al. | 203/1 |
| 3,502,852 A | * | 3/1970 | Lewis | 700/270 |
| 3,602,701 A | * | 8/1971 | Boyd, Jr. | 700/36 |
| 3,619,377 A | * | 11/1971 | Palmer et al. | 700/270 |
| 3,830,698 A | * | 8/1974 | Kleiss | 203/2 |
| 4,047,004 A | * | 9/1977 | Peiser | 703/9 |
| 4,096,574 A | * | 6/1978 | Christie | 700/270 |
| 4,347,577 A | * | 8/1982 | Ganster et al. | 700/272 |
| 4,371,944 A | * | 2/1983 | Stewart et al. | 700/270 |
| 4,526,657 A | * | 7/1985 | Hobbs et al. | 203/3 |
| 4,544,452 A | * | 10/1985 | Halliday et al. | 203/1 |
| 5,047,125 A | * | 9/1991 | Meier et al. | 203/2 |
| 5,260,865 A | * | 11/1993 | Beauford et al. | 700/31 |
| 5,302,253 A | * | 4/1994 | Lessard et al. | 196/132 |
| 5,779,911 A | * | 7/1998 | Haug et al. | 210/739 |
| 6,106,785 A | | 8/2000 | Havlena et al. | 422/109 |

OTHER PUBLICATIONS

HYSYS by Aspen Technology: http://www.hyprotech.com, no publication date.*
Transport Processes and Unit Operations by Christie J. Geankoplis.*
Ellerbe, R. W. "Steam–Distillation Basics" *Chemical Engineering* Mar. 4, 1974, pp. 105–112.

* cited by examiner

Primary Examiner—Jill Warden
Assistant Examiner—Elizabeth Quan
(74) Attorney, Agent, or Firm—John G. Tolomei; John G. Cutts

(57) ABSTRACT

A method of operation of a steam stripped fractionation column by using a computer to process the relevant operating parameters of the column to determine the undesirable approach to a possible flooding condition.

2 Claims, 1 Drawing Sheet

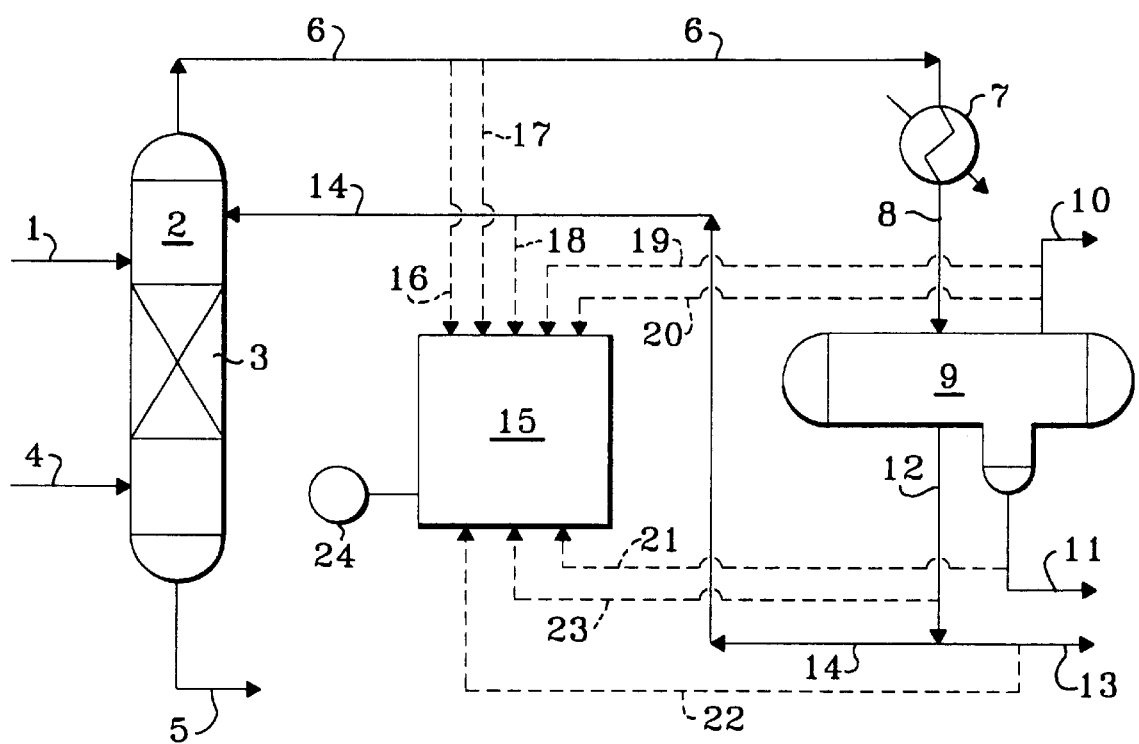

ial upsets due to flooding or corrosion problems.

METHOD FOR OPERATING A STEAM STRIPPED FRACTIONATION COLUMN

FIELD OF THE INVENTION

The present invention relates to a method for operating a steam stripped fractionation column to prevent water condensation on the fractionation trays located in the top of the column thereby obviating operational upsets due to flooding or other undesirable effects such as corrosion.

BACKGROUND OF THE INVENTION

Many different applications in the hydrocarbon refining and petrochemical industries employ the use of steam strippers to remove lower boiling compounds from liquid streams containing various boiling range compounds. The introduction of steam into a steam stripped fractionation column is beneficial for the separation of different boiling compounds, however, if too much steam is added for the amount of heat available in the column, steam will condense on the stripper trays where water builds up and eventually floods the stripper causing major operational upsets. The presence of liquid Water also leads to increased corrosion of the trays and walls of the stripper column. The present invention helps to prevent undesirable condensation of steam by providing the operator with an alarm that warns of conditions that approach the dew point so that the appropriate adjustments can be made before the stripper column is upset.

INFORMATION DISCLOSURE

An article by E. W. Ellerbe, titled "Steam Distillation Basics" and published in Chemical Engineering on Mar. 4, 1974, discloses that steam distillation offers a solution to some very difficult chemical-processing problems.

U.S. Pat. No. 6,106,785 (Havlena et al.) discloses a batch polymerization process controller using inferential sensing to determine the integral reaction heat which in turn is used to indicate the degree of polymerization of the reaction mixture batch.

SUMMARY OF THE INVENTION

The invention uses computers of well-known types to process the relevant information from a steam stripped fractionation column to determine the approach to a possible flooding problem. The column flooding begins when the dew point of water is reached in the top of the column and steam condenses to form water on the upper trays in the column.

One of the parameters or inputs is a measure of the total moles of hydrocarbon passing through the top of the column which includes the net overhead vapor and liquid and the reflux flow. The molecular weight of the hydrocarbon must be determined. The second parameter is the total moles of water in the overhead stream as measured by the flow of sour water from the overhead receiver. The mole fraction of water is the moles of water divided by the total moles of hydrocarbon in the overhead streams. The temperature and pressure of the column overhead must be known. The partial pressure of water is calculated as the product of the mole fraction of water and the column overhead pressure.

The computer has storage banks or memory which contains the thermodynamic properties of water and are commonly referred to as steam tables in paper form. With the hereinabove-described parameters and the thermodynamic properties of water, the dew point temperature of water in the column overhead can be determined. A comparison between the calculated dew point temperature of the water vapor in the column overhead and the temperature in the column overhead indicates whether or not the initiation of flooding is occurring.

One embodiment of the present invention is a method for operating a steam stripped fractionation column with the aid of a digital computer comprising: (a) measuring and providing the total moles of hydrocarbon passing overhead in the steam stripped fractionation column to the computer; (b) measuring and providing the total moles of water as steam passing overhead in the steam stripped fractionation column to the computer; (c) constantly determining the mole fraction of water as steam passing overhead in the steam stripped fractionation column; (d) measuring and providing the overhead pressure of the steam stripped fractionation column to the computer; (e) constantly determining the partial pressure of water by calculating the product of the mole fraction of water and the steam stripped fractionation column overhead pressure; (f) providing the computer with a database for the thermodynamic properties of water; (g) constantly determining the dew point temperature of the steam passing overhead in the steam stripped fractionation column; (h) measuring and providing the top temperature of the steam stripped fractionation column; and (i) rendering an alarm when the calculated difference between the dew point temperature determined in step (g) and the top temperature of the steam stripped fractionation column is less than a predetermined value.

BRIEF DESCRIPTION OF THE DRAWING

The drawing is a simplified process flow diagram of a preferred embodiment of the present invention. The drawing is intended to be schematically illustrative of the present invention and not a limitation thereof.

DETAILED DESCRIPTION OF THE INVENTION

Steam distillation affords a very handy tool for solving some difficult separation problems. The unique vapor-pressure behavior of immiscible fluids is at the heart of the theory developed for this unit operation, and an understanding of the theory enables an artisan to establish the equilibrium relationship for distillation calculations. From this point, the method for calculating most of the factors involved in the design of stills and auxiliaries for steam distillations are but the application of other chemical engineering principles. Using them, such things as the heat that must be supplied in vaporization and removed in condensation, the volumes of vapors and liquids to be handled, and the heating and cooling surfaces necessary can be readily calculated.

Once a steam distillation column has been designed and built, the responsibility turns to the operators to achieve a smooth running, economical separation process to produce on-spec products while minimizing undesirable operational upsets. One difficult operation in a steam distillation column is to monitor and supply the correct amount of steam to the column in order to ensure the appropriate separation while at the same time avoiding condensation of the steam on the top trays which may lead to a flooding condition and a major operational upset.

The present invention is a method for operating a steam stripped fractionation column whereby a notice is provided to warn of an approach to operating conditions which may lead to impending flooding of the column. A standard digital computer may be employed in this method. The computer preferably has a data storage bank of suitable size to contain the thermodynamic properties of water and the calculating ability to supply and generate a suitable output to achieve the desired results. Once the databank is loaded, the computer is supplied with a measurement of the total moles of hydrocarbon passing overhead in the steam stripped fractionation column. Then the measured total moles of water as steam passing overhead in the steam stripped fractionation column is supplied to the computer. This measurement is most conveniently made by monitoring the flow of steam condensate in the form of liquid which is removed from the stripper overhead receiver. From the data continuously inputted into the computer, a repeated calculation of the mole fraction of water as steam passing overhead in the column is made.

Another input signal to the computer is the measured overhead pressure of the column. From the inputted data, a continuous determination of the partial pressure of water is made by calculating the product of the mole fraction of water as steam passing overhead in the column and the column overhead pressure. In addition, a continuous determination of the dew point temperature of the steam passing overhead in the column is made. The top temperature of the column is measured and provided to the computer wherein the difference between the calculated dew point temperature of the steam passing overhead in the column and the measured top temperature is calculated. As this calculated difference approaches zero, the potential for developing a flooded column is realized. For the sake of satisfactory operation, a predetermined value is selected and compared with the calculated difference in order to generate an alarm to alert the operator of unsatisfactory column operation. Once an alarm is detected, the operator may then make the appropriate adjustments to the column in order to avoid flooding the column. In an alternative course of action fully contemplated by the present invention, a computer may be used to suggest corrective action or to actually automatically make the appropriate adjustments with or without operator assistance. One preferred corrective action is the addition of additional heat to the column in order to ensure the maintenance of an appropriate top temperature of the column. The method of the present invention may also be used to continuously adjust the heat input to the column in order to maintain the desired top temperature of the column.

DETAILED DESCRIPTION OF THE DRAWING

In the drawing, the process of the present invention is illustrated by means of a simplified schematic flow diagram in which such details as pumps, instrumentation, heat-exchange and heat-recovery circuits, compressors and similar hardware have been deleted as being non-essential to an understanding of the techniques involved. The use of such miscellaneous equipment is well within the purview of one skilled in the art.

With reference now to the drawing, a heavy hydrocarbonaceous feedstock is introduced by line 1 into steam stripped fractionation column 2. Steam is introduced by line 4 in a lower portion of steam stripped fractionation column 2 and travels upwardly through contacting zone 3 in order to strip volatile components from the downwardly flowing heavy hydrocarbonaceous feedstock. A heavy hydrocarbonaceous stream having a reduced concentration of volatile components is removed from steam stripped fractionation column 2 via line 5 and recovered. A vapor stream containing lower boiling hydrocarbons, which have been stripped from the feedstock, and steam is removed from steam stripped fractionation column 2 by line 6 and is introduced into heat-exchanger 7. A cooled and partially condensed stream containing steam condensate, liquid hydrocarbons and normally gaseous hydrocarbons is removed from heat-exchanger 7 via line 8 and introduced into stripper receiver 9. A sour gas stream containing gaseous hydrocarbons is removed from stripper receiver 9 via line 10 and recovered. Steam condensate is removed from stripper receiver 9 via line 11 and recovered. A liquid hydrocarbon stream is removed from stripper receiver 9 via line 12 and at least a portion is transported via line 14 and introduced into steam stripped fractionation column 2 as reflux and another portion is removed from the process via line 13 and recovered. A signal indicating the overhead or vapor temperature in line 6 transmitted via line 16 to computer 15. An overhead receiver pressure signal from line 6 is transported to computer 15 via line 17. A reflux flow rate signal from line 14 is transmitted via line 18 to computer 15. An overhead net gas flow rate signal originating from line 10 is transmitted via line 19 to computer 15. An overhead net gas molecular weight signal derived from line 10 is transmitted via line 20 to computer 15. An overhead steam condensate flow rate signal derived from line 11 is transmitted via line 21 to computer 15. An overhead net liquid flow rate signal originating from line 13 is transmitted via line 22 to computer 15. An input signal indicative of the mole weight of the material carried in line 12 is transmitted to computer 15 via line 23. This signal can be either the output of an on-line analyzer, or a manual data entry by the operator. An output signal from computer 15 is indicated in temperature alarm 24.

The foregoing description and drawing clearly illustrate the advantages encompassed by the process of the present invention and the benefits to be afforded with the use thereof.

What is claimed:

1. A method for operating a steam stripped fractionation column with the aid of a digital computer comprising:
   (a) measuring and providing the total moles of hydrocarbon passing overhead in the steam stripped fractionation column to the computer;
   (b) measuring and providing the total moles of water as steam passing overhead in the stream stripped fractionation column to the computer;
   (c) constantly determining the mole fraction of water as steam passing overhead in the steam stripped fractionation column;

(d) measuring and providing the overhead pressure of the steam stripped fractionation column to the computer;

(e) constantly determining the partial pressure of water by calculating the product of the mole fraction of water and the steam stripped fractionation column overhead pressure;

(f) providing the computer with a database for the thermodynamic properties of water;

(g) constantly determining the dew point temperature of the steam passing overhead in the steam stripped fractionation column;

(h) measuring and providing the top temperature of the steam stripped fractionation column; and (i) rendering an alarm when the calculated difference between the dew point temperature determined in step (g) and the top temperature of the steam stripped fractionation column in step (h) is less than a predetermined value.

2. The method of claim 1 wherein when the difference calculated in step (i) is less than the predetermined value, the heat input to the stripped fractionation column is increased.

* * * * *